United States Patent
Polehn et al.

(10) Patent No.: US 11,252,788 B2
(45) Date of Patent: Feb. 15, 2022

(54) SYSTEMS AND METHODS FOR CONTENT SELECTION AND DELIVERY BASED ON RADIO ACCESS NETWORK ("RAN") CONDITIONS

(71) Applicant: Verizon Patent and Licensing Inc., Arlington, VA (US)

(72) Inventors: Donna L. Polehn, Mercer Island, WA (US); Corey J. Christopherson, Bainbridge Island, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

(21) Appl. No.: 16/774,833

(22) Filed: Jan. 28, 2020

(65) Prior Publication Data

US 2021/0235545 A1    Jul. 29, 2021

(51) Int. Cl.
| | | |
|---|---|---|
| *H04W 4/00* | (2018.01) | |
| *H04W 88/08* | (2009.01) | |
| *H04W 74/08* | (2009.01) | |
| *H04W 48/12* | (2009.01) | |
| *H04W 24/02* | (2009.01) | |
| *H04W 88/12* | (2009.01) | |

(52) U.S. Cl.
CPC ........... *H04W 88/08* (2013.01); *H04W 24/02* (2013.01); *H04W 48/12* (2013.01); *H04W 74/0833* (2013.01); *H04W 88/12* (2013.01)

(58) Field of Classification Search
CPC ..... H04W 88/08; H04W 24/02; H04W 48/12; H04W 74/0833; H04W 88/12
See application file for complete search history.

(56) References Cited

U.S. PATENT DOCUMENTS

| | | | |
|---|---|---|---|
| 2015/0085875 A1* | 3/2015 | Phillips | H04N 21/2402 370/465 |
| 2016/0127954 A1* | 5/2016 | Zhou | H04W 28/22 370/231 |
| 2017/0164161 A1* | 6/2017 | Gupta | H04W 4/023 |
| 2020/0053591 A1* | 2/2020 | Prasad | G06N 3/0445 |
| 2020/0162535 A1* | 5/2020 | Ma | G06N 3/08 |
| 2020/0204484 A1* | 6/2020 | Altman | H04L 47/125 |

OTHER PUBLICATIONS

M. Allman et al., "TCP Congestion Control," Network Working Group Request for Comments 5681, Sep. 2009.

* cited by examiner

*Primary Examiner* — Erika A Washington

(57) ABSTRACT

A system described herein may provide a technique for the modeling of channel condition information, associated with a base station of a radio access network ("RAN") associated with a wireless network, over time. The model may be used to determine, estimate, or predict channel information associated with the base station at a given time, such as a time corresponding to a request for content (e.g., streaming content). The channel condition information corresponding to this time, as determined based on the model, may be used to select a particular version of the content to provide in response to the request. By virtue of receiving this information, the content provider may forgo performing a speed test, a ramp up transmission scheme, and/or other technique that may otherwise used to select the version of the content to provide in response to the request.

20 Claims, 7 Drawing Sheets

US 11,252,788 B2

SYSTEMS AND METHODS FOR CONTENT SELECTION AND DELIVERY BASED ON RADIO ACCESS NETWORK ("RAN") CONDITIONS

BACKGROUND

Content providers, such as streaming video providers, may utilize techniques such as speed tests, throttled streaming, and/or other techniques to determine a manner in which to provide content to a given user. For example, one user's device may be capable of receiving a higher bandwidth stream (such as a 1080p resolution video stream) while another user's device may only be capable of receiving a lower bandwidth stream (such as a 480p resolution video stream). In some situations, these differing capabilities may be caused by differing levels of wireless connectivity.

DETAILED DESCRIPTION OF THE PREFERRED EMBODIMENTS

The following detailed description refers to the accompanying drawings. The same reference numbers in different drawings may identify the same or similar elements.

Embodiments described herein provide for the modeling of channel conditions associated with one or more wireless components of a wireless network, such as one or more base stations (e.g., Long-Term Evolution ("LTE") evolved Node Bs ("eNBs"), Fifth Generation ("5G") Next Generation Node Bs ("gNBs"), etc.) that implement a radio access network ("RAN") of the wireless network. The model may be used as a predictive model to determine or estimate present or future conditions of one or more radio frequency ("RF") channels associated with a base station, and indicate the present or future conditions to a content provider. The content provider may use the information to select a transmission methodology for the content.

For instance, the content provider may select a particular version of the content (e.g., where different candidate versions correspond to different encoding schemes, resolutions, etc. that may result in differing amounts of data consumed by delivering the content). Further, as the content provider is made aware of the channel conditions, the content provider may not need to perform a speed test or utilize other techniques, such as Slow Start Transmission Control Protocol ("TCP") algorithm to determine the quality or capacity of an end-to-end link between the content provider and the recipient of the content. Using a Slow Start TCP algorithm may involve progressively increasing the throughput of data transmitted by the content provider until packet loss is detected, or until a maximum traffic throughput is reached (e.g., a maximum throughput that the content provider is capable of). Instead, a more aggressive transmission methodology (e.g., a Bottleneck Bandwidth and Round-trip propagation time ("BBR") algorithm) may be used. The selected algorithm may be more "aggressive" in that a higher throughput of data may be transmitted earlier in time than if a less aggressive algorithm were used. Using a more aggressive algorithm (e.g., BBR) may result in an enhanced user experience, as a user requesting content may no longer need to wait for the ramp up time associated with a less aggressive algorithm (e.g., Slow Start). Further, the more aggressive algorithm may result in enhanced traffic management by a base station, which may be able to use the larger amounts of data (e.g., resulting from using a more aggressive transmission scheme) to more accurately model and queue traffic. The more accurate modeling and queuing may result in greater utilization of Physical Resource Blocks ("PRBs") associated with the base station than if the traffic were provided to the base station more gradually (e.g., in which case the base station may continue to update and modify the modeling and queuing of the traffic, which may ultimately result in lower PRB utilization).

Figure 1:
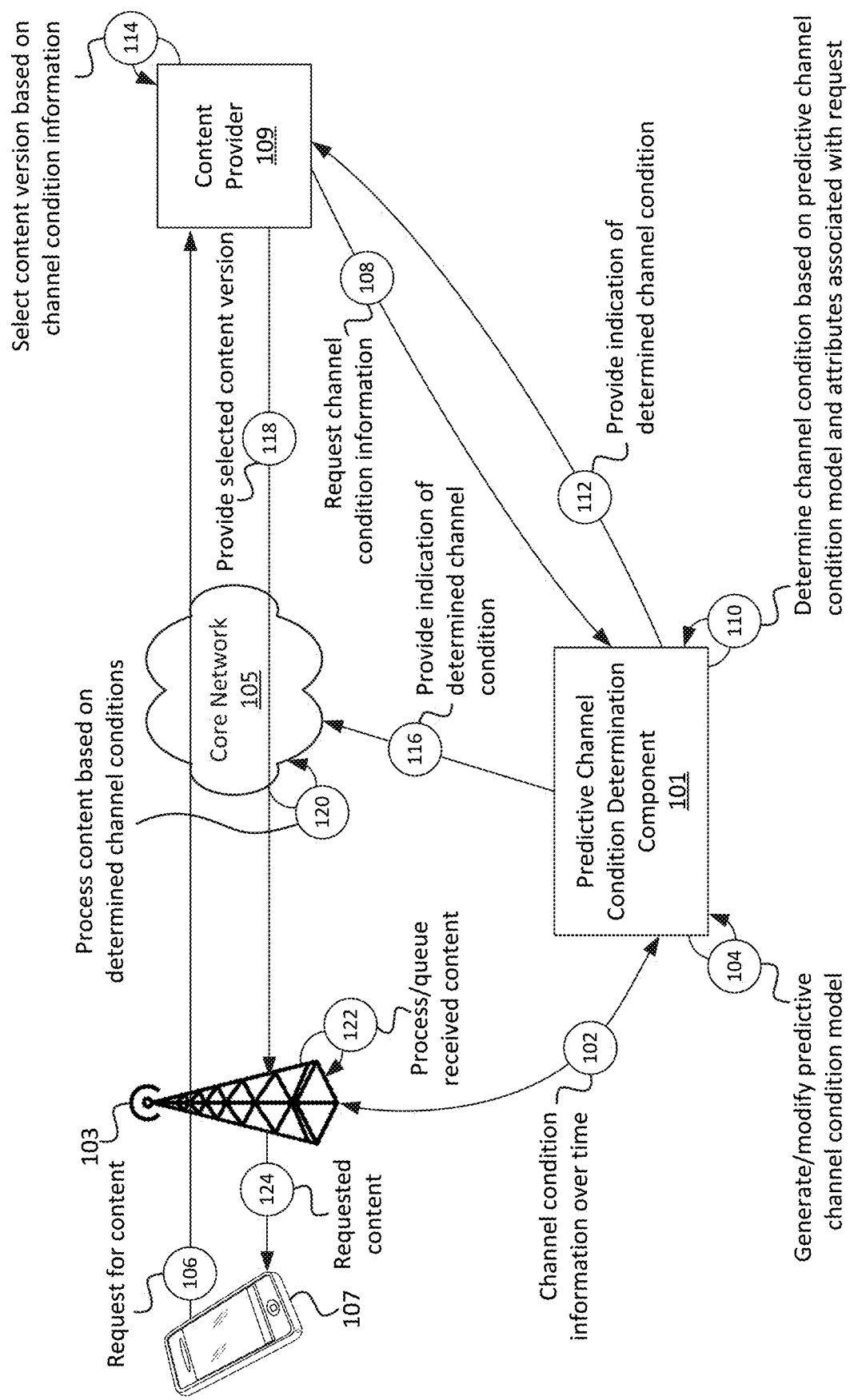
FIG. 1 illustrates an example overview of one or more embodiments described herein, in which channel conditions associated with a base station may be modeled over a period of time, and in which the model may be used by a content provider to select content to provide to a User Equipment ("UE"), in accordance with some embodiments.

As shown in FIG. 1, for example, a Predictive Channel Condition Determination Component ("PCCDC") 101 may be communicatively coupled with base station 103 (e.g., an eNB, a gNB, and/or some other base station) of a RAN associated with a wireless network. In some embodiments, PCCDC 101 may be in "indirect" communications with base station 103 (e.g., communications between PCCDC 101 and base station 103 may traverse one or more network devices not explicitly shown in this figure, such as a Mobility and Management Entity ("MME"), an Access and Mobility Management Function ("AMF"), and/or some other device associated with core network 105). In some embodiments, PCCDC 101 may be in "direct" communication with base station 103 (e.g., communications between PCCDC 101 and base station 103 may not traverse core network 105, such as via an X2 interface), and/or communications between PCCDC 101 and base station 103 may traverse one or more networks not explicitly shown here. In some embodiments, some or all of the functionality described herein with respect to PCCDC 101 may be implemented by one or more devices that implement some or all of the functionality of base station 103.

As shown, PCCDC 101 may receive (at 102) channel condition information from base station 103 over time. Additionally, or alternatively, PCCDC 101 may receive channel condition information, associated with base station 103, from one or more other devices or systems that determine or maintain this information (e.g., an MME, AMF, and/or other suitable device or system).

The channel condition information may include one or more metrics that indicate physical channel conditions (e.g., Received Signal Strength Indicator ("RSSI"), Signal-to-Interference-and-Noise-Ratio ("SINR"), Channel Quality Indicator ("CQI"), Reference Signal Received Power ("RSRP"), Reference Signal Received Quality ("RSRQ"), or the like) between base station 103 and one or more wireless devices (e.g., User Equipment ("UE") devices, such as mobile phones, Internet of Things ("IoT") devices, etc.). In some embodiments, the channel condition information may include traffic-related metrics of traffic between base station 103 and one or more UEs, such as latency, throughput, jitter, packet loss, or the like. In some embodiments, the channel condition information may include overall information describing capacity, load, etc. of base station 103, such as PRB utilization of base station 103 (e.g., indicating used and/or unused PRBs), quantity of UEs connected to base station 103, etc. The channel condition information may also be correlated to attributes of base station 103 and/or of one or more UEs connected to base station 103, such as geographic location of base station 103 and/or the one or more UEs, device type of UEs connected to base station 103, whether UEs are moving or stationary, Quality of Service ("QoS") values associated with traffic sent to UEs (e.g., QoS Class Indicator ("QCI") values), or the like. The channel condition information may also be correlated to temporal data (e.g., indicating time of day, day of week, month, season, etc.), such that trends in some or all of the above described metrics may be identified based on time (e.g., heavy traffic during certain hours of the day, low PRB utilization on Saturdays and Sundays, etc.).

PCCDC 101 may generate and/or modify (at 104) a predictive channel condition model based on the channel condition information received over time. For example, PCCDC 101 may utilize machine learning and/or other techniques (e.g., classification, regression, clustering, principle component analysis, and/or some other suitable technique) to identify or determine trends in the channel condition information. Examples of channel condition information that may be determined based on the predictive model are provided below. In practice, the channel condition information and/or the predictive model may include (or may be used to determine) additional and/or different information. For example, different combinations of the factors discussed below (and/or other factors) may be used to generate the predictive model. In situations where a predictive model already exists for base station 103, PCCDC 101 may modify the predictive model based on the channel condition information received over time (e.g., may generate a modified version of the predictive model based on the channel condition information received over time).

PCCDC 101 may, for example, determine that channel conditions vary based on temporal factors. For example, PCCDC 101 may determine that PRB utilization of base station 103 is relatively high during the hours of 9 AM-5 PM on Monday through Friday, and that PRB utilization of base station 103 is relatively low during the hours of 5 PM-8 AM on Monday through Friday and/or on Saturday and Sunday. As another example, PCCDC 101 may determine that RF channel quality between one or more UEs and base station 103 (e.g., based on CQI, RSSI, SINR, RSRP, etc. values determined and/or reported by the UEs) varies based on time.

As yet another example, the predictive model may be based on traffic-related metrics (e.g., latency between UEs and base station 103, end-to-end latency between UEs and one or more other devices when the UEs communicate with the one or more other devices via base station 103, throughput of traffic between UEs and base station 103 and/or one or more other devices, jitter of traffic between UEs and base station 103 and/or one or more other devices, etc.). These metrics may be provided by the UEs and/or one or more elements of core network 105 (which may communicate this information to PCCDC 101 via an API, a NEF, a SCEF, and/or some other suitable device, system, or technique).

The predictive model may correlate the traffic-related metrics to temporal factors, in some embodiments. For example, PCCDC 101 may determine that UEs tend to experience higher throughput, lower latency, etc. during certain times of day as opposed to during other times of day. In some embodiments, determining the traffic-related metrics may include determining an average value, median value, and/or some other value that reflects traffic-related metrics over a given time window. For example, PCCDC 101 may determine that UEs receive traffic at an average throughput of 0.5 Megabits per second ("Mb/s") between the hours of 3 PM and 5 PM, and an average throughput of 0.7 MB/s between the hours of 5 PM and 7 PM.

The predictive model may also include attributes of base station 103, such as geographic location, radio access technologies ("RATs") implemented by base station 103 (e.g., an LTE RAT, a 5G RAT, etc.), and/or other attributes of base station 103. In some embodiments, PCCDC 101 may correlate other types of information to categorize or classify base station 103. For example, PCCDC 101 may receive map or landmark information (e.g., from a device or system that maintains and/or provides such information—not explicitly shown in FIG. 1), based on which PCCDC 101 may determine that the geographic location of base station 103 is relatively close to (e.g., within a threshold distance of) a highway. Based on determining that base station 103 is located relatively close to a highway, PCCDC 101 may classify or categorize base station 103 as being associated with "moving" UEs, and/or PCCDC 101 may classify or categorize UEs that are connected to base station 103 as being moving UEs.

In some embodiments, PCCDC 101 may receive information regarding events that are scheduled to occur in proximity to base station 103 (e.g., within a threshold distance of base station 103). Such events may include sporting events, music concerts, and/or other events that may be associated with a temporarily increased quantity of UEs connected to base station 103. This information may be reflected in the predictive model, and may affect the determination or estimation of channel conditions based on the predictive model. For example, if an event is scheduled to take place within one hour at a location that is within a coverage area associated with base station 103, the predictive model may be used to determine or predict that channel quality associated with base station 103 may be reduced (e.g., at times corresponding to the scheduled start time and/or end time of the event).

The predictive model may also be based on user feedback in response to the transmission of content using different parameters. User feedback may be received in the form of explicit feedback, such as user ratings or responses to surveys (e.g., "Rate the quality of this video" or "How was the video quality?"). Additionally, or alternatively, user feedback may be inferred based on user actions, such as the premature stopping of the streaming of content (e.g., before the entire content has been provided), or the less frequent streaming of content when connected to base station 103 than in other instances. The user feedback may be received from UE 107, content provider 109, and/or some other device or system that maintains or receives such information. Further, user feedback and/or user behavior may be collected with the consent of the user.

At some point (e.g., after the predictive model has been generated), a particular UE (e.g., UE 107), which is connected to base station 103, may request (at 106) content from a content provider (e.g., content provider 109). For example, UE 107 may request streaming video content, streaming music content, a file download, or the like. The content request may include identifying information associated with UE 107, such as an Internet Protocol ("IP") address associated with the UE, a Mobile Directory Number ("MDN") associated with the UE, and/or some other identifier. Content provider 109 may be a device or system that hosts and provides content, such as a server device or cloud computing system that implements one or more server devices. In some embodiments, content provider 109 may be accessible via the Internet (e.g., one or more devices of core network 105 may communicate with content provider 109 via the Internet). In some embodiments, content provider 109 may be, or may include, a Content Delivery Network ("CDN") device, which may be accessible (e.g., by core network 105) without traversing the Internet or some other network that is external to core network 105. Generally speaking, a CDN may store a cached copy of a web-accessible resource (e.g., files associated with streaming content), such that delivery of the resource via the CDN may be faster and/or consume fewer network resources than delivery of the same resource via a device or system that provides the resource via the Internet or another network.

Based on the content request, content provider 109 may request (at 108) channel condition information, associated with the request (e.g., associated with channel conditions between UE 107 and base station 103, and/or associated with end-to-end traffic metrics associated with UE 107) from PCCDC 101. For example, PCCDC 101 may implement an application programming interface ("API"), via which content provider 109 may communicate with PCCDC 101. In some embodiments, PCCDC 101 may communicate with content provider 109 via a Service Capability Exposure Function ("SCEF"), a Network Exposure Function ("NEF"), and/or some other network device (associated with core network 105) that provides information from devices or systems associated with core network 105 to external components, such as content provider 109.

The request for channel condition information (made at 108) may, in some embodiments, include identifying information for UE 107 (e.g., an IP address associated with UE 107, a MDN associated with UE, and/or other suitable information), which may have been received (at 106) from UE 107. Additionally, or alternatively, the request (made at 108) may include other identifying information, which may be different from the identifying information provided by UE 107 (at 106). For example, while not explicitly shown in this figure, content provider 109 may maintain or communicate with a repository that correlates identifying information included in content requests (such as an IP address) to other types of identifiers (e.g., a hashed value based on the IP address and/or some other value) and/or to other attributes associated with UE 107 (e.g., a device type associated with UE 107, a subscription associated with UE 107, and/or other information.

In response to the request for channel condition information, PCCDC 101 may compare (at 110) attributes associated with the request to the predictive model, in order to determine or estimate the channel condition information. Below are some examples of factors that may be used to determine or estimate the channel condition information, in accordance with some embodiments. In practice, similar concepts may apply, and/or multiple combinations of the factors described below (and/or other factors) may be used to determine or estimate channel condition information.

For example, PCCDC 101 may determine temporal factors associated with the request, such as a present time of day, day of week, etc. PCCDC 101 may also determine or receive channel quality measurements reported by UE 107 (e.g., to base station 103 and/or to one or more elements of core network 105), such as CQI, RSSI, SINR, etc. PCCDC 101 may also receive location information associated with UE 107, which may indicate a distance of UE 107 from base station 103 and/or may be used to determine a velocity of UE 107. Based on the velocity of UE 107, PCCDC 101 may determine, for instance, whether UE 107 is a "moving" or stationary UE.

PCCDC 101 may also receive or determine attributes of the requested content. For example, the request (provided at 108) from content provider 109 may include one or more attributes of the content, such as content name (or another unique identifier of the content), length, resolution, file size, throughput, and/or other attributes. In some embodiments, the request may include identifying information for the content, and PCCDC 101 may use the identifying information to obtain the attributes of the content from content provider 109 and/or some other device or system that maintains and/or provides content attribute information. In some embodiments, the attributes of the content may indicate different versions of the content that are available. Different versions may include, for example, different encoding schemes, resolutions, audio configurations, etc. that are based on the same source material. These different versions may result in differing file sizes and/or differing throughput requirements for delivery to UE 107. For example, a 1080p resolution version of a streamed movie may be associated with larger file sizes and/or higher throughput requirements than a lower resolution version of the streamed movie (e.g., a 720p version or a 480p version).

In some embodiments, the attributes of the content may include the length of the content. PCCDC 101 may take the length of content into account when comparing the attributes of the content to the predictive model. For example, PCCDC 101 may determine that a particular version of the content should be provided if UE 107 is moving fast enough such that UE 107 is not likely to be in range of base station 103 for the full duration of the content, and may determine that another version of the content should be provided if UE 107 is stationary (and/or is moving slowly enough such that UE 107 is likely to be in range of base station 103 for the full duration of the content).

In some embodiments, PCCDC 101 may determine one or more attributes of UE 107 and/or a subscription associated with UE 107. PCCDC 101 may receive such information from a device or system that maintains such information (such as a Home Subscriber Server ("HSS") or Unified Data Management function ("UDM") associated with core network 105, which may be accessed via a SCEF or NEF, respectively). The subscription information may be used to identify, for example, one or more QoS levels associated with UE 107, such as minimum or maximum measures of traffic-related metrics (e.g., throughput, latency, jitter, packet loss, etc.).

Based on a comparison of the factors discussed above, and/or one or more other factors, to the predictive model, PCCDC 101 may determine (at 101) channel condition information to report to content provider 109. In accordance with some embodiments, PCCDC 101 may determine, format, and/or report the channel condition information in one or more ways. For example, in some embodiments, the channel condition information may take the form of a score that is derived from one or more of the factors discussed above, where a higher score may generally indicate that content provider 109 should transmit a greater amount of traffic associated with the content (e.g., a higher resolution version of the content), while a lower score may generally indicate that content provider 109 should transmit a lesser amount of traffic associated with the content. In some embodiments, the channel condition information may include, and/or may be formatted as, raw values that indicate one or more of the above factors (e.g., actual throughput, latency, SINR, RSSI, etc. measurements). In some embodiments, the channel condition information may include, and/or may be formatted as, multiple scores that are derived from raw values associated with these factors (e.g., a first score or value that is derived from actual throughput measurements, a second score or value that is derived from actual SINR values, etc.). In some embodiments, the channel condition information reported by PCCDC 101 may include, and/or may be accompanied by, other information associated with a given UE (e.g., subscription information associated with the UE, which may indicate minimum or maximum QoS requirements, and/or other suitable information).

As one example of generating an overall channel condition score that is derived from factors associated with particular UE 107, PCCDC 101 may generate a relatively high score, such as a score of 99 out of 100, when UE 107 has requested the content at a time of day that is historically correlated (as indicated by the predictive model) with low PRB utilization at base station 103 and/or is historically correlated with relatively high throughput and low latency. In some embodiments, the score may be modified (e.g., a multiplier may be applied) based on a subscription associated with UE 107. For example, the high score may be based on a determination by PCCDC 101 that UE 107 is associated with a subscription that indicates a relatively high QoS level (e.g., a minimum throughput that correlates with a highest resolution version of the requested content). The high score may also be based on a determination that the content is of a particular length (e.g., one hour) and that UE 107 is stationary (which may be based on presently received information indicating a location of UE 107, and/or based on historical information based on which an inference may be made that UE 107 will remain within range of base station 103 for at least one hour).

Further continuing with this example, the high score may be based on a determination or prediction that PRB utilization of base station 103 will remain relatively low (e.g., as indicated by the predictive model) for the duration of the content. For example, PCCDC 101 may determine that the request for content was received at 3 PM, that PRB utilization associated with base station 103 is relatively low between the hours of 3 PM and 5 PM, and that the length of the content is one hour. Further assume that the PRB utilization associated with base station 103 is relatively high between the hours of 5 PM and 7 PM. In this situation also, the score generated by PCCDC 101 may be relatively high, as the content would end at approximately 4 PM (i.e., a one hour offset from the time of the request), even though PRB utilization may rise later.

As another example of generating an overall channel condition score that is derived from factors associated with particular UE 107, PCCDC 101 may generate a relatively low score, such as a score of 1 out of 100, when UE 107 has requested the content at a time of day that is historically correlated (as indicated by the predictive model) with high PRB utilization at base station 103 and/or is historically correlated with relatively low throughput and high latency. The relatively low score may be based on a subscription associated with UE 107, such as based on a determination that UE 107 is associated with a subscription that indicates a relatively low QoS level (e.g., a maximum throughput that correlates with a lowest resolution version of the requested content, and/or a "best effort" QoS level). The low score may also be based on a determination that the content is of a particular length (e.g., one hour) and that UE 107 is moving (which may be based on presently received information indicating a location of UE 107, and/or based on historical information based on which an inference may be made that UE 107 will move out of range of base station 103 within one hour).

Further continuing with this example, the low score may be based on a determination or prediction that PRB utilization of base station 103 will remain or become relatively high (e.g., as indicated by the predictive model) during the duration of the content. For example, PCCDC 101 may determine that the request for content was received at 9 AM, that PRB utilization associated with base station 103 is relatively high between the hours of 8 AM and 11 AM, and that the length of the content is one hour. In this situation also, the score generated by PCCDC 101 may be relatively low, as the entire duration of the content is covered by the period (8 AM-11 AM) during which PRB utilization has been determined as being historically high (e.g., above a threshold level of utilization, as indicated by the predictive model).

As mentioned above, in addition to, or in lieu of a score that reflects channel conditions, PCCDC 101 may determine or generate other information to respond to the request (at 108) for channel condition information. For example, PCCDC 101 may provide raw values for certain metrics, and/or may provide scores for individual metrics in addition to, or in lieu of, an overall score generated based on several metrics and/or present UE information. For instance, while not explicitly shown in FIG. 1, content provider 109 and PCCDC 101 may perform an authentication process, during which PCCDC 101 may determine or verify the identify of content provider 109 and any associated permissions associated with content provider 109 (e.g., where different content providers may have access to different types of information and/or different types of channel condition information). Based on this authentication process, PCCDC 101 may determine whether to provide an overall score to content provider 109 (e.g., as discussed above by way of example), and/or to provide different types of information (e.g., raw values and/or scores that reflect individual raw values). In some embodiments, the request (at 108) may specify the type or format of channel condition information to provide. In some embodiments, PCCDC 101 may provide the channel condition information in the format specified in the request. In some embodiments, PCCDC 101 may perform an authentication process to verify that content provider 109 is authorized to request the channel condition information in the format specified in the request. If content provider 109 is not authorized to request the channel condition information in the format specified in the request, PCCDC 101 may respond to the request with a "default" format (which may be independent of, and therefore different from, the format specified in the request).

PCCDC 101 may provide (at 112) an indication of the determined channel condition to content provider 109. As discussed above, this indication may be provided as one or more scores and/or information indicating one or more raw values. The scores and/or raw values may be based on the predictive model, which may be formed based on values measured over time, and may be determined based on attributes of UE 107, a subscriber associated with UE 107, attributes of the request for content (e.g., time of day), attributes of the requested content (e.g., length of content, file size or throughput requirements of the content, etc.), and/or other suitable factors.

Content provider 109 may, based on the channel condition information, select (at 114) a version of the content (requested at 106). For example, content provider 109 may select a particular version of the content based on the channel condition information (e.g., where different versions have differing file sizes, differing encoding schemes, and/or have which are associated with different throughputs for playback or transmission). Generally speaking, if UE 107 and/or base station 103 is associated with (as indicated by the channel condition information) higher channel quality, content provider 109 may select a higher quality version of the content (e.g., which may consume more throughput and/or be associated with larger file sizes) to transmit to UE 107 (or, more specifically to base station 103 for forwarding to UE 107, via an IP-based bearer (such as an Evolved Packet System ("EPS") bearer, protocol data unit ("PDU") session, etc.) between elements of core network 105 and base station 103). On the other hand, if UE 107 and/or base station 103 is associated with a lower channel quality, content provider 109 may select a lower quality version of the content to transmit to UE 107.

For instance, assume that the requested content (requested at 106) includes video content, for which content provider 109 stores three different versions: (a) an "ultra-high" resolution version (e.g., a 2160p or "4K" resolution), (b) a "high" resolution version (e.g., a 1080p resolution), and (c) a "standard" resolution version (e.g., a 480p resolution). If the channel condition information (indicated at 112) includes a score above a first threshold score (e.g., which may be based on relatively high SINR, RSSI, etc. associated with the connection between UE 107 and base station 103), content provider 109 may select the ultra-high resolution version of the content to provide to UE 107. If the channel condition information indicates a score below the first threshold but above a second threshold, then content provider 109 may select the high resolution version of the content. If, on the other hand, the channel condition information indicates a score below the second threshold, then content provider 109 may select the standard resolution version of the content.

These examples are provided in the context of the channel condition including an overall score. In practice, similar concepts may apply based on the channel condition information including individual raw values (and/or scores derived from individual values) for individual metrics. For example, PCCDC 101 may provide raw values indicating that physical channel characteristics are, or are estimated to be, generally high (e.g., high values for SINR, RSSI, etc., as determined based on the predictive model), while also providing raw values indicating that traffic-related metrics are generally low (e.g., values for throughput that are below a required throughput for a given version of requested content). In this situation, content provider 109 may select a lower quality version of content based on the traffic-related metrics, even if the physical channel metrics would otherwise be considered high.

In some embodiments, PCCDC 101 may provide (at 116) the channel condition information to one or more elements of core network 105 (e.g., to a Packet Data Network ("PDN") Gateway ("PGW"), a User Plane Function ("UPF"), a Serving Gateway ("SGW"), and/or one or more other devices or systems of core network 105). Providing this information to elements of core network 105 may allow core network 105 to process, handle, etc. traffic in accordance with the determined channel condition, such as in situations where content provider 109 does not act in a manner consistent with the channel conditions. For example, if the channel conditions indicate a relatively low channel quality and content provider 109 outputs a high resolution version of the requested content, one or more elements of core network 105 may transcode the content in accordance with the channel conditions (e.g., may transcode the content to a lower resolution). Additionally, or alternatively, core network 105 may notify PCCDC 101 and/or content provider 109 that content provider 109 has not sent traffic in accordance with the determined channel condition. Additionally, or alternatively, core network 105 may reject traffic from content provider 109 in such situations. Additionally, or alternatively, core network 105 may buffer the content for an amount of time, such that core network 105 may utilize an aggressive transmission scheme (e.g., a BBR algorithm and/or an algorithm that does not utilize a ramp up time), and/or may send rapid acknowledgements to content provider 109 when data is received from content provider 109. The rapid acknowledgements may operate to more quickly ramp up a Slow Start (or similar) algorithm used by content provider 109, in the event that content provider 109 uses such an algorithm.

Content provider 109 may provide (at 118) the content to UE 107 using the selected transmission methodology (e.g., content provider 109 may forward the content to base station 103 via core network 105). As discussed above, one or more elements of core network 105 may process (at 120) the content based on the channel conditions. Base station 103 may receive the content and may process and/or queue (at 122) the content. As mentioned above, and as described in more detail below, the processing/queueing of the traffic, as sent using an aggressive transmission scheme, may allow for increased resource utilization at base station 103, thereby enhancing the efficient use of resources at base station 103. Base station 103 may forward (at 124) the requested content in accordance with the queueing and processing performed by base station 103.

While some operations above are described as being performed by content provider 109, in some embodiments, some or all of these operations may be performed by PCCDC 101. For example, PCCDC 101 may receive information indicating multiple versions of content available (e.g., by communicating with content provider 109 and/or some other device or system), may select a particular version of the content based on channel conditions (e.g., as determined or predicted based on the predictive model), and may indicate the selected version to content provider 109 (which may, in turn, deliver the selected version of the content).

Allowing for the selection of content (e.g., selection of a particular version of content) based on the channel condition information allows content provider 109 to utilize aggressive transmission and/or congestion control schemes. For example, as mentioned above, as content provider 109 has been made "aware" of the channel conditions (e.g., as predicted, determined, or estimated based on historical channel information), content provider 109 may not need to utilize less aggressive transmission schemes, such as a "Slow Start" TCP transmission algorithm, in order to determine an optimal version of the content to select (e.g., in which a lowest or lower quality version is initially provided, and the amount of data sent is gradually increased and an optimal version, such as a higher quality version, may eventually be selected). Instead, since content provider 109 has been provided with information indicating the channel conditions, content provider 109 may be able to "stuff the pipe" between content provider 109 and base station 103 and send the optimal version of the content without needing to perform a Slow Start transmission scheme, perform a speed test, and/or perform other operations to determine the version of the content to transmit to UE 107. For example, content provider 109 may be able to use a BBR transmission scheme or some other transmission scheme that provides more of the content base station 103 faster than less aggressive transmission schemes.

As mentioned above, not needing to perform these types of operations may result in an enhanced user experience, as the optimal version of the content may be delivered to the user faster than if other procedures need to be performed before delivering the optimal version of the content. Furthermore, providing more of the traffic to base station 103 allows base station 103 to buffer the traffic according to its own load balancing and optimization schemes, which may include outputting more buffered data (such as the content provided by content provider 109) when load is relatively low. This increases resource utilization of base station 103 (e.g., PRB utilization) at times that base station 103 would otherwise be idle, and further frees up resources that may be needed in the future.

Figure 2A:
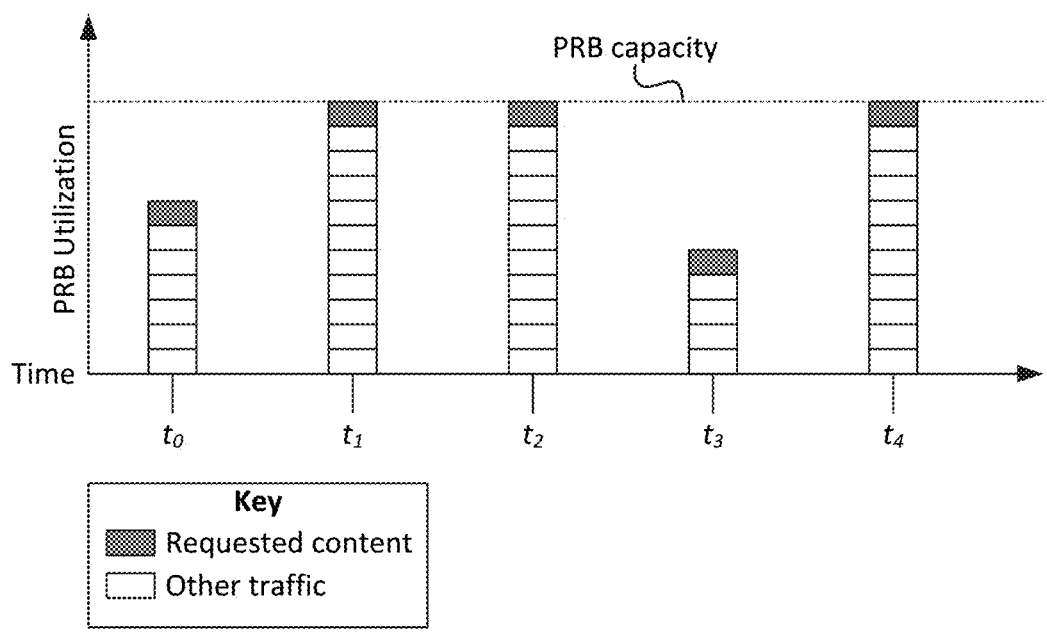
FIG. 2A conceptually illustrates resource utilization at a base station of a radio access network ("RAN"), in which content may be provided relatively slowly to the base station for wireless transmission to a UE.
Figure 2B:
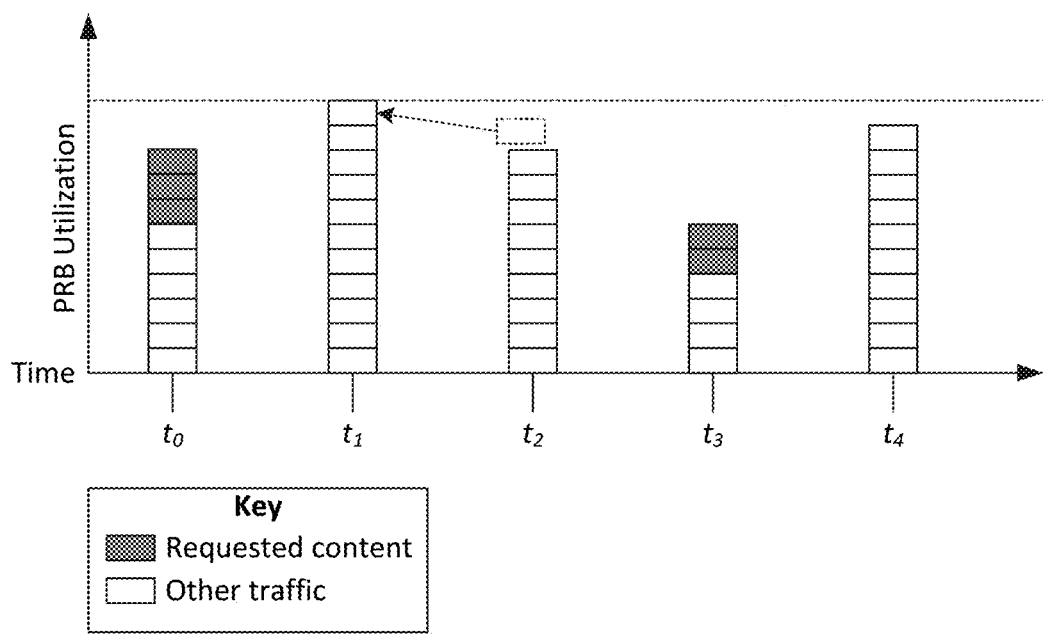
FIG. 2B conceptually illustrates enhanced resource utilization at a base station of a RAN, in accordance with some embodiments.

An example of this benefit is illustrated in FIGS. 2A and 2B. These figures show alternate graphs of PRB utilization of base station 103 at five different points in time, from $t_0$ to $t_4$. PRB utilization is conceptualized here as a quantity of blocks used by base station 103 for the wireless transmission of traffic, as compared to a PRB capacity of base station 103 (illustrated as the dashed line marked "PRB capacity" in FIG. 2A). FIG. 2A illustrates an example of PRB utilization may occur when traffic is throttled and/or provided slowly (e.g., using a Slow Start algorithm) to base station 103 by content provider 109, while FIG. 2B illustrates an example of PRB utilization that may occur when traffic is provided using a more aggressive transmission methodology, such as is provided by some embodiments.

As shown in FIG. 2A, for example, traffic associated with the requested content (indicated in the figure by the shaded blocks) may be steadily provided by base station 103 to UE 107 (e.g., one shaded block per time window). This may be the result of base station 103 receiving the traffic slowly from content provider 109 (e.g., as part of a Slow Start or similar transmission methodology by content provider 109). As shown, PRB utilization may be under capacity at $t_0$ and $t_3$, while maximum PRB utilization may be reached at $t_1$, $t_2$, and $t_4$. In other words, traffic that could otherwise be transmitted at $t_1$, $t_2$, and $t_4$ may not be able to be transmitted by base station 103, as PRB utilization is at maximum at those times.

In FIG. 2B, however, base station 103 may have received the traffic associated with the requested content (e.g., from content provider 109) according to a more aggressive transmission scheme, and may therefore have more of the traffic available (e.g., in a buffer or a queue) to transmit to UE 107 at certain times. For example, as shown, base station 103 may be able to output three times as much traffic associated with the requested content (as denoted by the three shaded blocks) at $t_0$, freeing up PRBs at subsequent times $t_1$ and $t_2$. This traffic may be received by UE 107 and may be buffered or cached by UE 107 until such time is appropriate, such as when the content is to be presented or displayed by UE 107. As a result of the freeing up of resources at times $t_1$ and $t_2$, base station 103 may be able to send more traffic, other than traffic related to this content, at $t_1$ than was done in FIG. 2A. For example, as shown in FIG. 2B, base station 103 may be able to transmit some traffic at $t_1$ rather than at $t_2$ (as denoted by the shaded box and arrow in the figure), which may enhance the performance associated with the traffic that was now transmitted at $t_1$ rather than at $t_2$, and may also free up resources at $t_2$ in case additional traffic is to be transmitted during that time window. Similarly, extra traffic associated with the requested content may be transmitted at $t_3$, freeing up additional PRBs at $t_4$. That is, while not specifically shown here, other traffic may be sent using the PRBs that have been freed up at $t_2$ and $t_4$, thus enhancing the performance of other traffic flows.

Other illustrations of PRB usage, which are not provided here, may conceptually illustrate PRB utilization in other ways, without departing from the concepts illustrated herein. For example, other illustrations of PRB usage may use a grid notation, where one axis represents time and the other axis represents particular PRBs, and where elements of the grid (e.g., boxes) each represent a particular PRB that base station 103 has available. In such a notation, each element of the grid may be used to indicate whether a particular PRB, corresponding to the grid element, is utilized on a particular time window or not.

Figure 3:
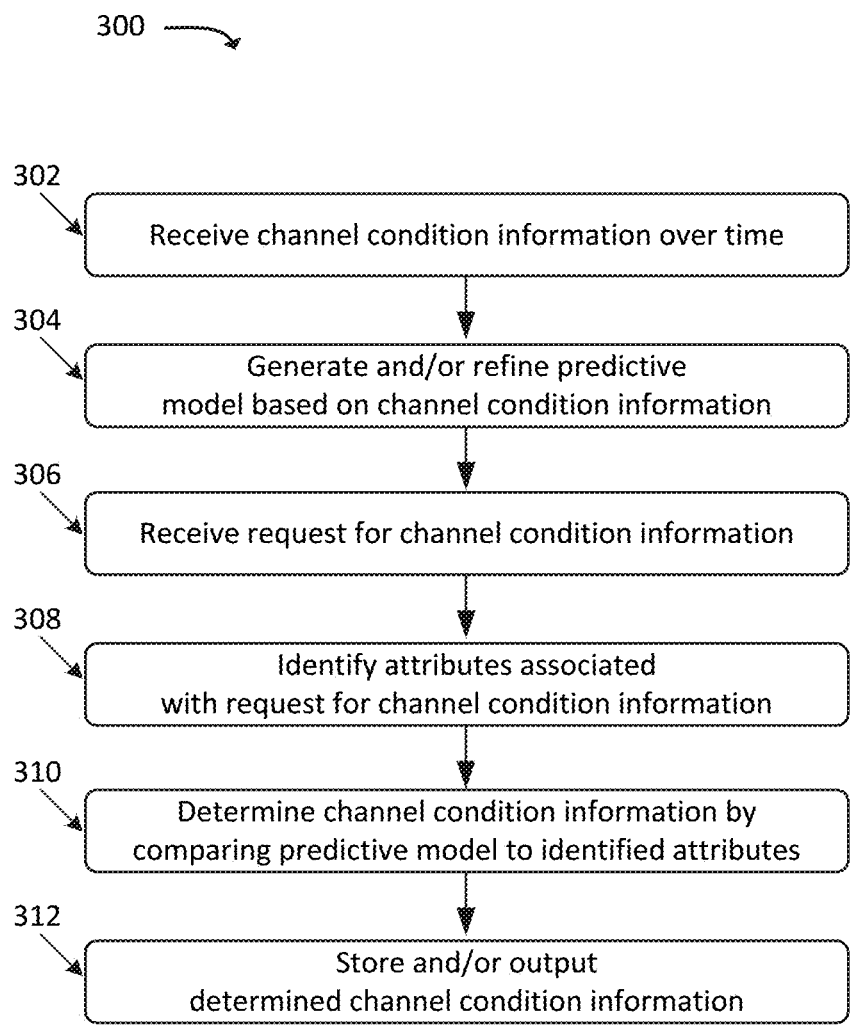
FIG. 3 illustrates an example process for generating and utilizing a predictive model to determine channel condition information, in accordance with some embodiments.

FIG. 3 illustrates an example process 300 for generating and utilizing a predictive model to determine channel condition information. In some embodiments, some or all of process 300 may be performed by PCCDC 101. In some embodiments, one or more other devices may perform some or all of process 300 (e.g., in concert with, and/or in lieu of, PCCDC 101).

As shown, process 300 may include receiving (at 302) channel condition information over time. For example, as discussed above, PCCDC 101 may receive information, associated with one or more RANs and/or base stations associated with a wireless network, such as eNBs, gNBs, etc. The channel condition information may indicate physical or radio-related metrics associated with the RANs and/or base stations and/or one or more UEs that are connected to such RANs and/or base stations, such as RSSI values, CQI values, RSRP values, metrics indicating PRB utilization, etc. The channel condition information may also include traffic-related metrics, such as latency (e.g., a round-trip delay time between a UE and a base station, between the UE and an application server, between the base station and the UE, and/or other measures of latency), throughput, jitter, etc. The channel condition information may be received through a direct interface between PCCDC 101 and one or more base stations and/or elements of a core network with which the base stations are communicatively coupled. For example, the channel condition information may be received from an MME, AMF, SCEF, NEF, and/or other suitable device or system.

Process 300 may further include generating and/or refining (at 304) one or more predictive models based on the received channel condition information. For example, as described above, PCCDC 101 may identify attributes of the received channel condition information, and may utilize machine learning and/or other techniques (e.g., classification, regression, clustering, principle component analysis, and/or some other suitable technique) to identify or determine trends in the channel condition information in order to generate a predictive model that may be used to determine or predict channel conditions.

Process 300 may additionally include receiving (at 306) a request for channel condition information. For example, as discussed above, PCCDC 101 may receive a request for channel condition information (e.g., via an application programming interface ("API") implemented by PCCDC 101, via which one or more other devices or systems may communicate such requests to PCCDC 101). The request may, in some situations, be received from an application server, content provider, CDN, or the like. The request may include content-related information, such as an identifier of content to be provided to the UE, information indicating different versions of the content, attributes of these different versions (e.g., file sizes, throughputs, resolutions, etc.). The request may, in some embodiments, include information based on which a particular UE (e.g., a UE to whom content is to be provided) may be identified. This identifying information may include, for example, an IP address associated with the UE, an MDN associated with the UE, etc. The request may include, and/or PCCDC 101 may communicate with one or more other devices or systems to identify, other information regarding the UE, such as whether the UE is moving or stationary, one or more QoS levels associated with the UE, etc.

Process 300 may also include identifying (at 308) one or more attributes associated with the request for the channel condition information. In some embodiments, for example, PCCDC 101 may identify the UE and/or a base station to which UE is connected, based on the information specified in the request. For example, PCCDC 101 may communicate with a HSS, UDM, and/or other device or system to identify the UE and/or base station, based on the information provided (at 306) in the request for channel condition information. PCCDC 101 may also identify one or more attributes associated with the request, such as a date or time associated with the request, attributes of content or of versions of the content to be provided to the UE, and/or other suitable information (e.g., as similarly discussed above).

Process 300 may further include determining (at 310) channel condition information by comparing the predictive model to the determined attributes. For example, PCCDC 101 may perform a suitable similarity analysis in order to identify channel conditions that most closely match or correlate to the attributes associated with the request (e.g., time of day, attributes of the UE and/or the requested content, etc.). As discussed above, determining the channel condition may include generating one or more scores and/or determining a particular content version to provide to the UE.

Process 300 may additionally include storing and/or outputting (at 312) the determined channel condition information. For example, PCCDC 101 may provide the channel condition information to one or more devices or systems, which may include a content provider that initially requested the information. The channel condition information may be used to select content (e.g., a version of content) to provide to the UE, using a relatively aggressive transmission and/or congestion control scheme, which may enable the base station to more efficiently utilize its resources, including potentially enhanced PRB utilization.

Figure 4:
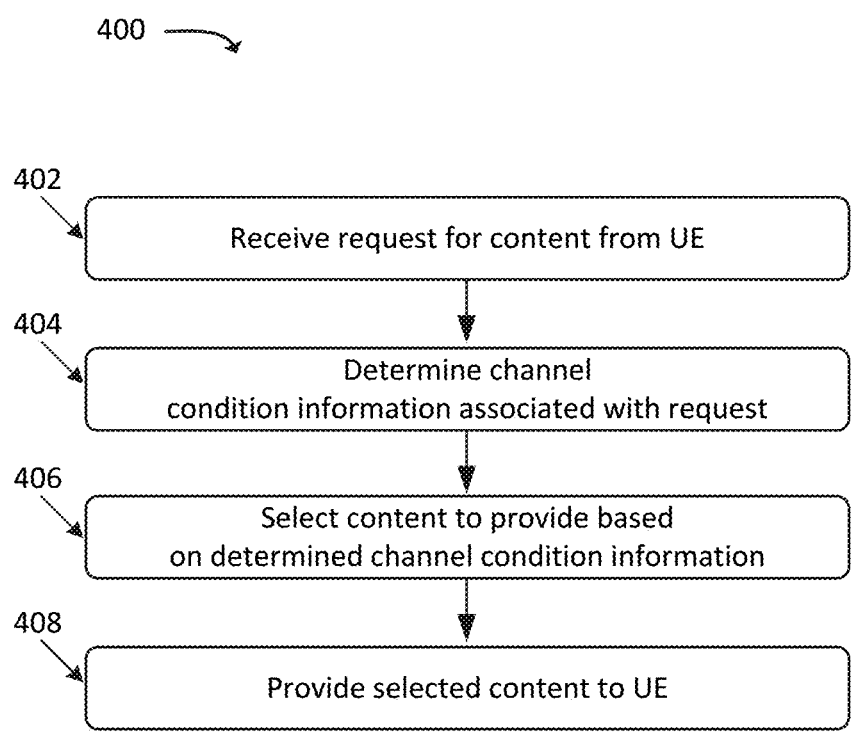
FIG. 4 illustrates an example process for selecting and providing content to a UE based on channel condition information (e.g., as determined based on a predictive model), in accordance with some embodiments.

FIG. 4 illustrates an example process 400 for selecting and providing content to a UE based on channel condition information (e.g., as determined based on a predictive model). In some embodiments, some or all of process 400 may be performed by content provider 109. In some embodiments, one or more other devices may perform some or all of process 400 (e.g., in concert with, and/or in lieu of, content provider 109).

As shown, process 400 may include receiving (at 402) a request for content from a UE. For example, as discussed above, content provider 109 may receive a request for content from UE 107. As also discussed above, content provider 109 may maintain, and/or may otherwise have access to, multiple versions of the requested content, where different versions consume different amounts of data (e.g., are associated with different throughputs), such as versions with differing resolutions.

Process 400 may further include determining (at 404) channel condition information associated with the request. For example, content provider 109 may request and receive channel condition information from PCCDC 101 and/or some other suitable device or system. As discussed above, the channel condition information may include one or more scores derived from multiple performance metrics, an indication of a particular version of content to use, one or more raw values for individual performance metrics, and/or scores that for individual performance metrics.

Process 400 may additionally include selecting (at 406) content to provide to based on the determined channel condition information. For example, content provider 109 may select a particular version of the content to provide to UE 107. For example, if content provider 109 has access to three versions of content, content provider 109 may select a lowest resolution of the content if the score is between 0-33 (out of 100), an intermediate resolution if the score is 34-66, and a highest version of the content if the score is between 67-100. As another example, content provider 109 may evaluate the score against specific thresholds associated with each version of the content. As yet another example, content provider 109 may receive an estimated or actual throughput associated with UE 107, and may select a version of the content that requires or utilizes approximately that amount of throughput, and/or less throughput.

Process 400 may also include providing (at 408) the selected content to the UE. For example, content provider 109 may forward the content to UE 107. As discussed above, content provider 109 may utilize a relatively aggressive or rapid transmission or congestion control algorithm, such as BBR, when providing the selected content, instead of using a transmission or congestion control algorithm that more slowly ramps up to an optimal throughput (e.g., Slow Start). The content may traverse one or more networks (e.g., core network 105, the Internet, etc.) before reaching base station 103. As mentioned above, base station 103 may queue and output the content in a more efficient manner than if the content were received by base station 103 more slowly.

Figure 5:
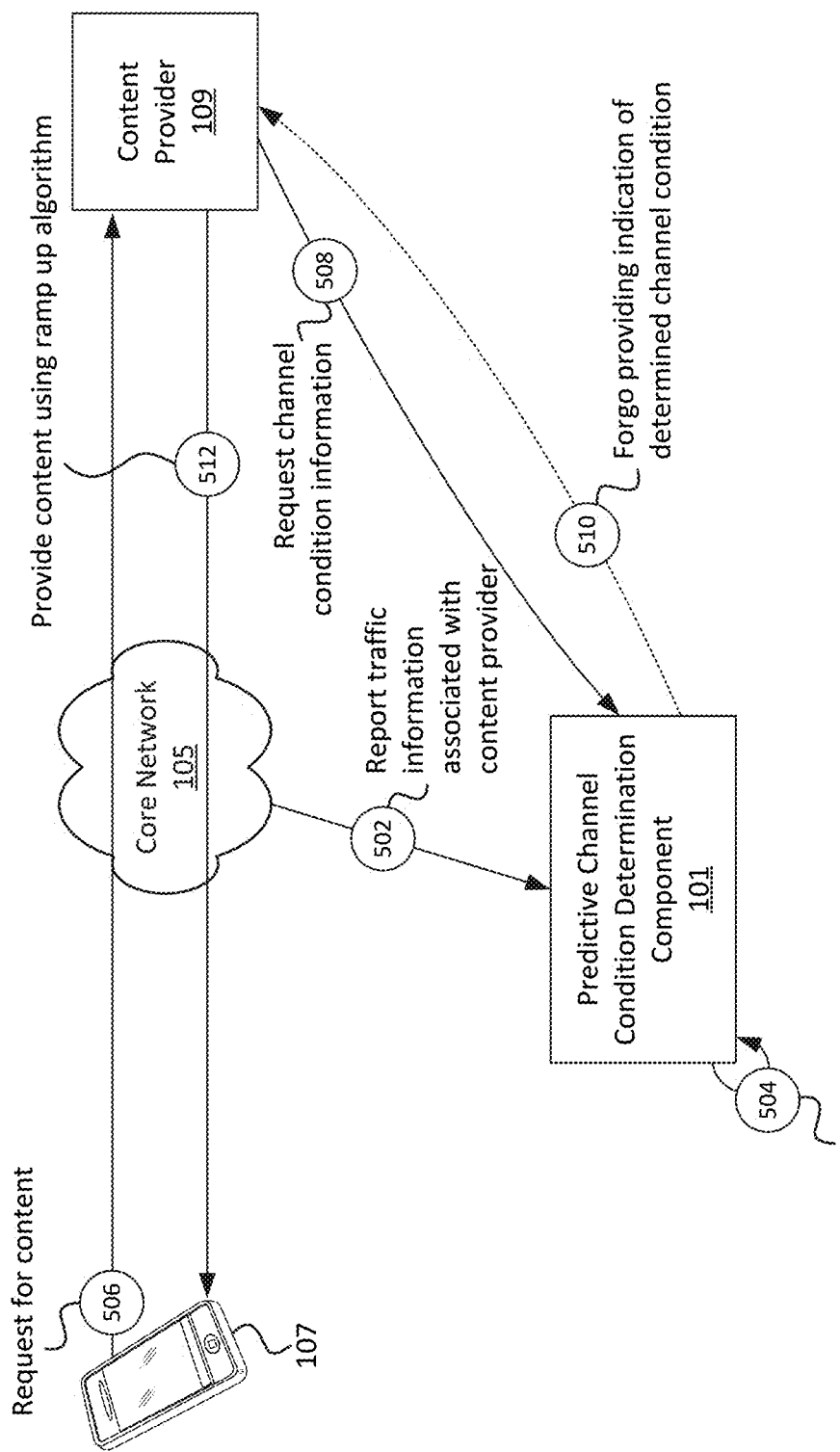
FIG. 5 illustrates an example of forgoing providing channel condition information to a content provider who has not provided content in accordance with previously provided channel condition information.

FIG. 5 illustrates an example of forgoing providing channel condition information to a content provider who has not provided in content in accordance with previously provided channel condition information. Some of the operations shown in FIG. 5 are similar or identical to operations shown in FIG. 1, and are not described in detail again here for the sake of brevity. As shown, one or more elements of core network 105 (e.g., a Serving Gateway ("SGW"), a Session Management Function ("SMF"), a PGW, a UPF, and/or one or more other devices) may report (at 502) traffic information associated with content provider 109. This information may indicate, for example, an amount of traffic sent by content provider 109, a throughput of traffic sent by content provider 109, a recipient of traffic sent by content provider 109, identifier(s) of content or versions of content sent by content provider 109, and/or other suitable information. The information may be determined (e.g., by the one or more elements of core network 105) using deep packet inspection, analyzing TCP/IP headers in the traffic, and/or other suitable techniques.

Based on this information, PCCDC 101 may determine (at 504) that content provider 109 is not transmitting traffic based on channel condition information previously provided. For example, PCCDC 101 may have previously provided a relatively high score, associated with UE 107, to content provider 109 in response to a request for channel conditions, and may determine (e.g., based on the information provided at 502) that content provider 109 has selected a relatively low quality (e.g., low resolution) version of the content, even though higher quality versions of the content are available. As another example, PCCDC 101 may determine that content provider 109 did not use an aggressive transmission scheme, and/or did not use a particular transmission scheme (from a set of suitable transmission schemes) to provide content to UE 107 after requesting channel condition information. As discussed below, this determination may be used to deny subsequent requests for channel condition information.

For example, UE 107 may request (at 506) content from content provider 109, and content provider 109 may request (at 508) channel condition information from PCCDC 101. Based on the determination that content provider 109 has not previously transmitted content in accordance with previously provided channel condition information, PCCDC 101 may forgo providing (at 510) an indication of the determined channel condition. Additionally, or alternatively, PCCDC 101 may send a message denying the request for channel condition information. As content provider 109 is at this point not "aware" of the channel condition information for UE 107, content provider 109 may provide (at 512) the requested content using a ramp up algorithm (e.g., Slow Start), based on which content provider 109 may select a particular version of the content (e.g., may select higher quality versions of the content as the ramping up progresses).

Figure 6:
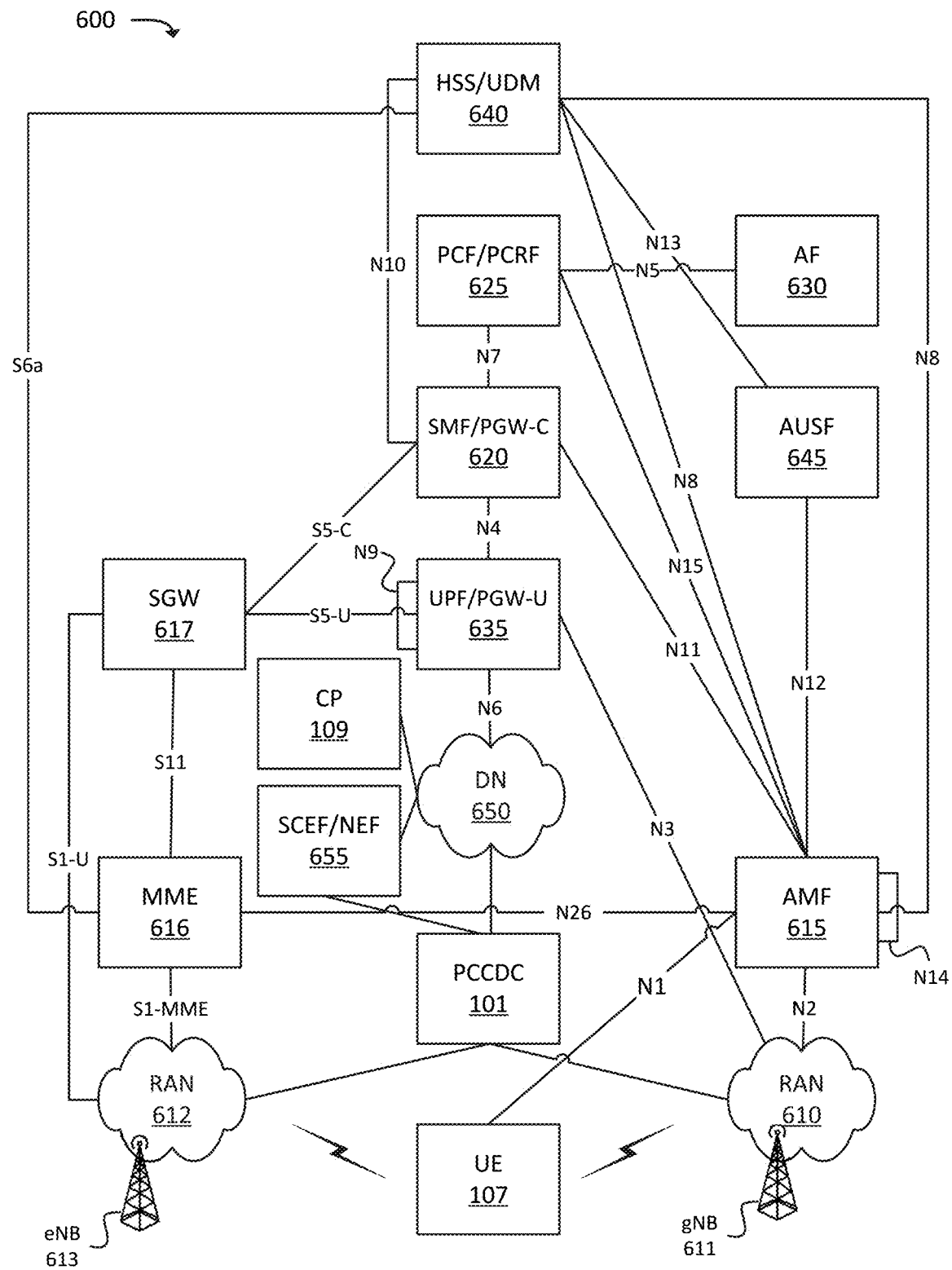
FIG. 6 illustrates an example environment, in which one or more embodiments described herein may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 600 may include UE 107, RAN 610 (which may include one or more gNBs 611), RAN 612 (which may include one or more one or more eNBs 613), AMF 615, SMF/PGW-Control plane function ("PGW-C") 620, Policy Control Function ("PCF")/Policy Charging and Rules Function ("PCRF") 625, Application Function ("AF") 630, UPF/PGW-User plane function ("PGW-U") 635, HSS/UDM 640, Authentication Server Function ("AUSF") 645, Data Network ("DN") 650, SCEF/NEF 655, PCCDC 101, and content provider 109.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 107 may include a computation and communication device, such as a wireless mobile communication device that is capable of communicating with RAN 610 and/or DN 650. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an IoT device, or another type of mobile computation and communication device. UE 107 may send traffic to and/or receive traffic (e.g., user plane traffic) from DN 650 via RAN 610 and UPF/PGW-U 635.

RAN 610 may be, or may include, a 5G RAN that includes one or more base stations (e.g., one or more gNBs 611), via which UE 107 may communicate with one or more other elements of environment 600. UE 107 may communicate with RAN 610 via an air interface (e.g., as provided by gNB 611). For instance, RAN 610 may receive traffic (e.g., voice call traffic, data traffic, messaging traffic, signaling traffic, etc.) from UE 107 via the air interface, and may communicate the traffic to UPF/PGW-U 635, and/or one or more other devices or networks. Similarly, RAN 610 may receive traffic intended for UE 107 (e.g., from UPF/PGW-U 635, AMF 615, and/or one or more other devices or networks) and may communicate the traffic to UE 107 via the air interface.

RAN 612 may be, or may include, an LTE RAN that includes one or more base stations (e.g., one or more eNBs 613), via which UE 107 may communicate with one or more other elements of environment 600. UE 107 may communicate with RAN 612 via an air interface (e.g., as provided by eNB 613). For instance, RAN 610 may receive traffic (e.g., voice call traffic, data traffic, messaging traffic, signaling traffic, etc.) from UE 107 via the air interface, and may communicate the traffic to UPF/PGW-U 635, and/or one or more other devices or networks. Similarly, RAN 610 may receive traffic intended for UE 107 (e.g., from UPF/PGW-U 635, SGW 517, and/or one or more other devices or networks) and may communicate the traffic to UE 107 via the air interface.

AMF 615 may include one or more devices, systems, Virtualized Network Functions ("VNFs"), etc., that perform operations to register UE 107 with the 5G network, to establish bearer channels associated with a session with UE 107, to hand off UE 107 from the 5G network to another network, to hand off UE 107 from the other network to the 5G network, and/or to perform other operations. In some embodiments, the 5G network may include multiple AMFs 615, which communicate with each other via the N14 interface (denoted in FIG. 6 by the line marked "N14" originating and terminating at AMF 615).

SGW 517 may include one or more devices, systems, VNFs, etc., that aggregate traffic received from one or more eNBs 613 and send the aggregated traffic to an external network or device via UPF/PGW-U 635. Additionally, SGW 517 may aggregate traffic received from one or more UPF/PGW-Us 635 and may send the aggregated traffic to one or more eNBs 613. SGW 517 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 107. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 107, from DN 650, and may forward the user plane data toward UE 107 (e.g., via RAN 610, SMF/PGW-C 620, and/or one or more other devices). In some embodiments, multiple UPFs 635 may be deployed (e.g., in different geographical locations), and the delivery of content to UE 107 may be coordinated via the N9 interface (e.g., as denoted in FIG. 6 by the line marked "N9" originating and terminating at UPF/PGW-U 635). Similarly, UPF/PGW-U 635 may receive traffic from UE 107 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 107.

DN 650 may include one or more wired and/or wireless networks. For example, DN 650 may include an IP-based PDN, a wide area network ("WAN") such as the Internet, a private enterprise network, and/or one or more other networks. UE 107 may communicate, through DN 650, with data servers, other UEs 107, content provider 109, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 107 may communicate.

SCEF/NEF 655 may include one or more devices, systems, VNFs, etc., that provide an interface between one or more core network elements described above and one or more devices or systems that are external to the network core. Thus, while lines are not shown in this figure between several of these elements and SCEF/NEF 655, such communication pathways may exist in practice, to enable SCEF/NEF 655 to have access to information provided by one or more of the illustrated network elements. As discussed herein, PCCDC 101 may communicate with SCEF/NEF 655 (e.g., via DN 650 and/or some other network or communication pathway) to obtain channel condition information from RAN 610 and/or RAN 612.

PCCDC 101 may include one or more devices, systems, VNFs, etc., that identify channel conditions (e.g., associated with RAN 610 and/or RAN 612) over time, and generate one or more predictive models based on these channel conditions. For example, PCCDC 101 may obtain such information via SCEF/NEF 655, and/or directly from gNB 611 and/or eNB 613 (e.g., via an X2 interface). PCCDC 101 may communicate with content provider 109 and/or some other suitable device (e.g., via DN 650), to provide channel condition information determined based on a comparison present conditions or attributes (e.g., attributes of UE 107, requesting content from content provider 109) to the predictive model.

Content provider 109 may include one or more devices, systems, VNFs, etc., that maintain or store content (e.g., to provide to UE 107). As discussed above, content provider 109 may selectively provide content to UE 107 based on channel condition information provided by PCCDC 101. Although not explicitly shown in this figure, content provider 109 may be, or may include, one or more CDNs that are located at a network "edge" (e.g., which may provide content to UE 107 without the content first traversing DN 650).

Figure 7:
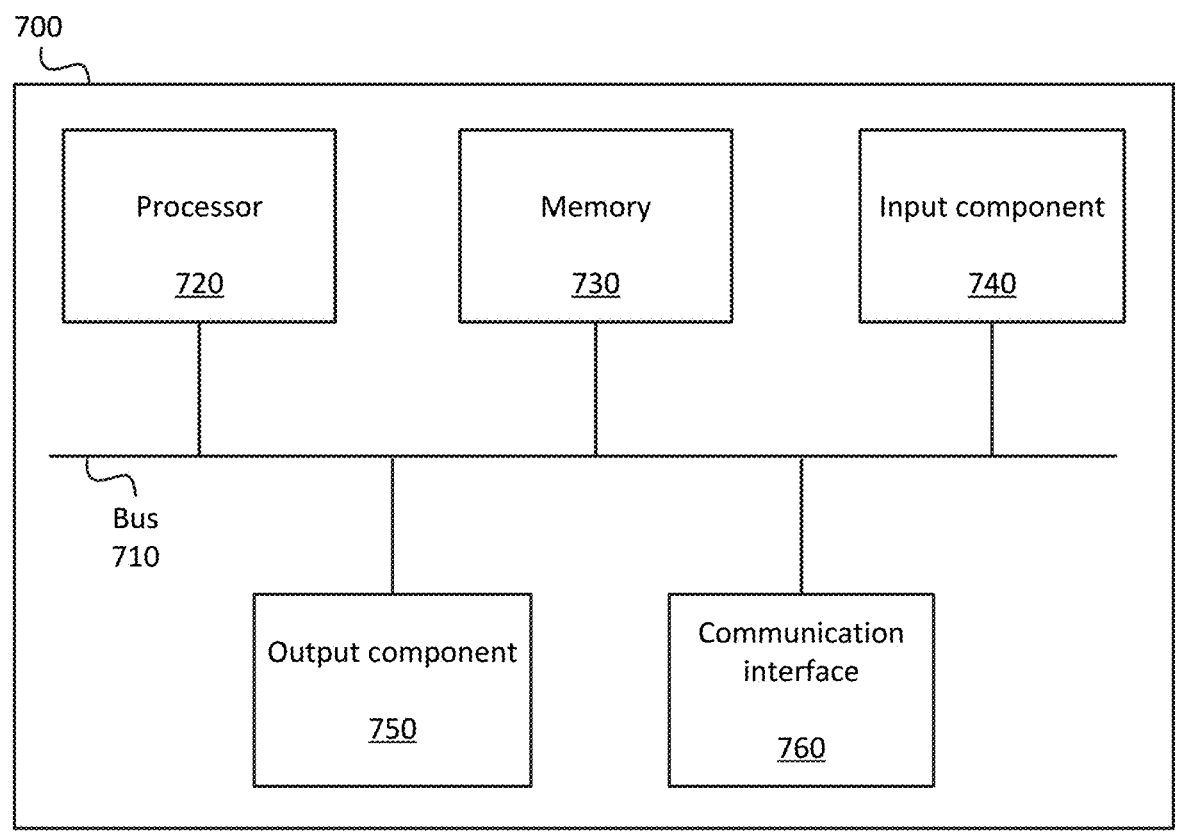
FIG. 7 illustrates example functional components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1 and 3-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
one or more processors configured to:
receive channel condition information, associated with a particular base station of a radio access network ("RAN") that includes a plurality of base stations, over a period of time;
generate a predictive model based on the received channel condition information;
receive, from a User Equipment ("UE") that is connected to the particular base station, a request for content, wherein the content is associated with a plurality of candidate versions;
compare one or more attributes associated with the request to the predictive model to determine channel conditions associated with the particular base station;
select a particular version of the content based on the channel conditions, associated with the particular base station, that were determined based on the comparing; and
output an indication of the selected particular version of the content, wherein outputting the indication causes the selected particular version of the content to be sent to the UE via the particular base station.

2. The system of claim 1, further comprising a Content Delivery Network ("CDN"), wherein the CDN receives the indication of the selected particular version of the content and sends the content to the UE via the particular base station.

3. The system of claim 1, wherein the indication of the selected particular version of the content is provided to a content provider device, wherein the content provider device utilizes the indication of the selected particular version of the content in lieu of using a ramp up transmission algorithm to determine which version of the content to provide to the UE.

4. The system of claim 3, wherein the content provider device utilizes a Bottleneck Bandwidth and Round-trip propagation time ("BBR") algorithm to provide the selected particular version of the content to the UE.

5. The system of claim 1, wherein comparing the one or more attributes associated with the request to the predictive model to determine the channel conditions associated with the particular base station includes:
determining temporal attributes associated with the request,
identifying, based on the predictive model and based on the temporal attributes associated with the request, historical channel conditions associated with the particular base station, and
determining the channel conditions associated with the particular base station based on the identified historical channel conditions associated with the particular base station.

6. The system of claim 5,
wherein determining temporal attributes associated with the request includes determining a particular time of day associated with the request,
wherein identifying, based on the predictive model and based on the temporal attributes associated with the request, historical channel conditions associated with the particular base station includes identifying, based on the predictive model, historical channel conditions associated with the particular base station at the same particular time of day, and
wherein determining the channel conditions associated with the particular base station based on the identified historical channel conditions associated with the particular base station includes determining the channel conditions associated with the particular base station based on the identified historical channel conditions associated with the particular base station at the same particular time of day.

7. The system of claim 1, wherein the plurality of candidate versions of the content are each associated with a different total amount or throughput of data.

8. A non-transitory computer-readable medium, storing a plurality of processor-executable instructions to:
receive channel condition information, associated with a particular base station of a radio access network ("RAN") that includes a plurality of base stations, over a period of time;
generate a predictive model based on the received channel condition information;
receive, from a User Equipment ("UE") that is connected to the particular base station, a request for content, wherein the content is associated with a plurality of candidate versions;
compare one or more attributes associated with the request to the predictive model to determine channel conditions associated with the particular base station;
select a particular version of the content based on the channel conditions, associated with the particular base station, that were determined based on the comparing; and
output an indication of the selected particular version of the content, wherein outputting the indication causes the selected particular version of the content to be sent to the UE via the particular base station.

9. The non-transitory computer-readable medium of claim 8, further comprising a Content Delivery Network ("CDN"), wherein the CDN receives the indication of the selected particular version of the content and sends the content to the UE via the particular base station.

10. The non-transitory computer-readable medium of claim 8, wherein the indication of the selected particular version of the content is provided to a content provider device, wherein the content provider device utilizes the indication of the selected particular version of the content in lieu of using a ramp up transmission algorithm to determine which version of the content to provide to the UE.

11. The non-transitory computer-readable medium of claim 10, wherein the content provider device utilizes a Bottleneck Bandwidth and Round-trip propagation time ("BBR") algorithm to provide the selected particular version of the content to the UE.

12. The non-transitory computer-readable medium of claim 8, wherein comparing the one or more attributes associated with the request to the predictive model to determine the channel conditions associated with the particular base station includes:
determining temporal attributes associated with the request,
identifying, based on the predictive model and based on the temporal attributes associated with the request, historical channel conditions associated with the particular base station, and
determining the channel conditions associated with the particular base station based on the identified historical channel conditions associated with the particular base station.

13. The non-transitory computer-readable medium of claim 12,
wherein determining temporal attributes associated with the request includes determining a particular time of day associated with the request,
wherein identifying, based on the predictive model and based on the temporal attributes associated with the request, historical channel conditions associated with the particular base station includes identifying, based on the predictive model, historical channel conditions associated with the particular base station at the same particular time of day, and
wherein determining the channel conditions associated with the particular base station based on the identified historical channel conditions associated with the particular base station includes determining the channel conditions associated with the particular base station based on the identified historical channel conditions associated with the particular base station at the same particular time of day.

14. The non-transitory computer-readable medium of claim 8, wherein the plurality of candidate versions of the content are each associated with a different total amount or throughput of data.

15. A method, comprising:
receiving channel condition information, associated with a particular base station of a radio access network ("RAN") that includes a plurality of base stations, over a period of time;
generating a predictive model based on the received channel condition information;
receiving, from a User Equipment ("UE") that is connected to the particular base station, a request for content, wherein the content is associated with a plurality of candidate versions;

comparing one or more attributes associated with the request to the predictive model to determine channel conditions associated with the particular base station;

selecting a particular version of the content based on the channel conditions, associated with the particular base station, that were determined based on the comparing; and outputting an indication of the selected particular version of the content, wherein outputting the indication causes the selected particular version of the content to be sent to the UE via the particular base station.

16. The method of claim 15, further comprising a Content Delivery Network ("CDN"), wherein the CDN receives the indication of the selected particular version of the content and sends the content to the UE via the particular base station.

17. The method of claim 15, wherein the indication of the selected particular version of the content is provided to a content provider device, wherein the content provider device utilizes the indication of the selected particular version of the content in lieu of using a ramp up transmission algorithm to determine which version of the content to provide to the UE.

18. The method of claim 17, wherein the content provider device utilizes a Bottleneck Bandwidth and Round-trip propagation time ("BBR") algorithm to provide the selected particular version of the content to the UE.

19. The method of claim 15, wherein comparing the one or more attributes associated with the request to the predictive model to determine the channel conditions associated with the particular base station includes:

determining temporal attributes associated with the request, identifying, based on the predictive model and based on the temporal attributes associated with the request, historical channel conditions associated with the particular base station, and determining the channel conditions associated with the particular base station based on the identified historical channel conditions associated with the particular base station.

20. The method of claim 19, wherein determining temporal attributes associated with the request includes determining a particular time of day associated with the request, wherein identifying, based on the predictive model and based on the temporal attributes associated with the request, historical channel conditions associated with the particular base station includes identifying, based on the predictive model, historical channel conditions associated with the particular base station at the same particular time of day, and wherein determining the channel conditions associated with the particular base station based on the identified historical channel conditions associated with the particular base station includes determining the channel conditions associated with the particular base station based on the identified historical channel conditions associated with the particular base station at the same particular time of day.

* * * * *